US012158890B2

(12) United States Patent
Mao et al.

(10) Patent No.: US 12,158,890 B2
(45) Date of Patent: Dec. 3, 2024

(54) INDUSTRIAL GEOGRAPHIC INFORMATION SYSTEM (71) Applicants: Beijing LongRuan Technologies Inc., Beijing (CN); PEKING UNIVERSITY, Beijing (CN)

(72) Inventors: Shanjun Mao, Beijing (CN); Pengpeng Zhang, Beijing (CN); Haoyuan Zhang, Beijing (CN); Jinchuan Chen, Beijing (CN); Mei Li, Beijing (CN); Huazhou Chen, Beijing (CN)

(73) Assignees: BEIJING LONGRUAN TECHNOLOGIES INC., Beijing (CN); PEKING UNIVERSITY, Beijing (CN)

( * ) Notice: Subject to any disclaimer, the term of this patent is extended or adjusted under 35 U.S.C. 154(b) by 0 days.

(21) Appl. No.: 18/597,534

(22) Filed: Mar. 6, 2024

(65) Prior Publication Data
US 2024/0303246 A1 Sep. 12, 2024

(30) Foreign Application Priority Data
Mar. 7, 2023 (CN) .......................... 202310252710.2

(51) Int. Cl.
G06F 16/24 (2019.01)
G05B 19/406 (2006.01)
(Continued)

(52) U.S. Cl.
CPC ..... *G06F 16/2477* (2019.01); *G05B 19/4063* (2013.01); *G05B 19/409* (2013.01); *G06F 16/29* (2019.01)

(58) Field of Classification Search
CPC . G06F 16/2477; G06F 16/29; G05B 19/4063; G05B 19/409
See application file for complete search history.

(56) References Cited

U.S. PATENT DOCUMENTS

2019/0324977 A1* 10/2019 Gonzalez Aguirre ....................... G06F 16/2219

FOREIGN PATENT DOCUMENTS

| CN | 102693306 | 9/2012 |
| CN | 111429583 | 7/2020 |

(Continued)

OTHER PUBLICATIONS

Mao et al., "Construction of information sharing platform of mine safe production for intelligent mining," Journal of China Coal Society, Jun. 2020, vol. 45, No. 6.

(Continued)

*Primary Examiner* — Hares Jami
(74) *Attorney, Agent, or Firm* — Hodgson Russ LLP (57) ABSTRACT The industrial geographical information system relates to the field of industrial production intelligent management and control and comprises a device acquisition control end, a spatio-temporal big data processing end and an industrial geographical information system platform end. Based on a spatial data unified management and analysis framework of the geographic information system, various sensors, monitoring devices and mobile devices in an industrial production environment are acquired to perceive real-time data, and the real-time data are cleaned, denoised, cached, distributed, stored and processed permanently. Various types of static spatial data are import and entered, a composite spatio-temporal object model is employed to make macroscopic and microscopic visualization, collaborative processing update, spatio-temporal analysis and linkage analysis of industrial production scenes and processes, and collaborative joint control of industrial production processes and devices are conducted based on the device acquisition control end.

8 Claims, 2 Drawing Sheets (51) Int. Cl.
      *G05B 19/4063*     (2006.01)
      *G05B 19/409*      (2006.01)
      *G06F 16/2458*     (2019.01)
      *G06F 16/29*       (2019.01)

(56) References Cited

FOREIGN PATENT DOCUMENTS

| CN | 111522894 | | | 8/2020 | | |
|----|-----------|---|---|--------|---|---|
| CN | 111680025 | | | 9/2020 | | |
| CN | 112016828 | | | 12/2020 | | |
| CN | 111522894 | B | * | 1/2021 | ............. | G06F 16/29 |
| CN | 112379653 | | | 2/2021 | | |
| CN | 113744390 | | | 12/2021 | | |
| CN | 114611180 | | | 6/2022 | | |
| CN | 115113789 | A | * | 9/2022 | | |
| CN | 115334098 | | | 11/2022 | | |
| CN | 115527013 | | | 12/2022 | | |

OTHER PUBLICATIONS

CNIPA, Notification to Grant Patent Right for Invention for CN Application No. 202310252710.2, Nov. 29, 2023.
CNIPA, First Office Action for CN Application No. 202310252710.2, Aug. 22, 2023.

* cited by examiner

INDUSTRIAL GEOGRAPHIC INFORMATION SYSTEM

CROSS-REFERENCE TO RELATED APPLICATIONS

The present application claims priority to Chinese Patent Application No. 202310252710.2, filed Mar. 7, 2023, the entire disclosure of which is incorporated by reference herein.

TECHNICAL FIELD

The present invention relates to the field of industrial production intelligent management and control, and more particularly, to an industrial geographic information system.

BACKGROUND

Since theory, technology and software and hardware systems of a geographic information system came into being in 1960s, the geographical information system has been widely used in traditional geoscience, digital city, intelligent transportation, high-tech war and other fields. In recent years, with the vertical and deep application of information technology in all walks of life, the construction of intelligent mines and intelligent plants has been ubiquitous. In the industrial fields represented by intelligent mines and intelligent plants, related workshops, devices, parts and working environments all belong to geospatial objects, and key objects related to industrial production, such as various subsystems, electromechanical devices and device parts, also have spatial positions and spatial topological relationships in a production process, which are in a more or less variation state at all times, and also need the support of the geographical information system for visualization, spatial analysis, collaborative joint control and the like.

At present, the application of the geographic information system in the intelligent plants and mines is mainly reflected in macroscopic geographic environment visualization, navigation and positioning, spatial query and analysis, and the like, most of which are based on multi-dimensional (x, y), (x, y, t), (x, y, z) and (x, y, z, t) coordinates, only reflecting real geographical position coordinates of an object in a spatial dimension, having a small amount of industrial state temporal dimension information expression, lacking integrated expression and application support of a whole process of all spatial objects in an industrial production process from a bottom layer of the geographic information system platform, lacking real-time synchronization and cooperative processing of geographic physical space and digital space in the industrial field, and lacking precise control on an industrial device and adaptive cooperative processing of a production process.

In the industrial fields represented by the intelligent mines and the intelligent plants, the key of the intelligent application is informatization, automation and intelligence of a whole service process management and execution control process. In addition to the traditional application of spatial positioning and visual appearance, the geographic information system also needs to solve fine expression of geographical spatial scenes and spatial objects inside and outside the device, real-time transmission and synchronization of geographical and device information, collaborative linkage between subsystems or parts of a production device, analysis and control of the industrial production process, and the like. Therefore, based on the theory of the geographic information system, it is of great practical significance to propose and establish an industrial geographic information system that adapts to the application of industrial intelligent management and control.

SUMMARY

In view of the above-mentioned problems, the present invention provides an industrial geographic information system, which can implement integrated topological expression, storage, analysis and collaborative control of macroscopic and microscopic space objects of industrial production scenes and processes, solve a problem that traditional geographic information systems cannot implement integrated expression, real-time dynamic data support and collaborative linkage control of microscopic and fine scenes, and provide a visual management and control platform based on the geographic information system for intelligent industrial production.

Embodiments of the present invention provide an industrial geographic information system, comprising: a device acquisition control end, a spatio-temporal big data processing end and an industrial geographic information system platform end, wherein the device acquisition control end, the spatio-temporal big data processing end and the industrial geographic information system platform end are connected by means of wire or wireless;

the device acquisition control end comprises: a device real-time data acquisition module and a device configuration control module;

the device real-time data acquisition module acquires real-time data of sensing devices such as various sensors, controllers, monitoring devices and mobile devices in an industrial production environment;

the device configuration control module controls various devices through a controller, a frequency converter and a protector, and provides device-end access and control support for the the industrial geographic information system platform end;

the spatio-temporal big data processing end is used for real-time data processing and storage and processing of geospatial data, the spatio-temporal big data processing end accesses dynamic real-time data of the device acquisition control end through a network, and performs cleaning, denoising, caching, distribution and persistent storage processing on the dynamic real-time data, the spatio-temporal big data processing end also completes storage of various formatted and unformatted static geospatial data through import and entry, and provides spatio-temporal big data analysis of spatio-temporal data composed of the dynamic real-time data and the static geospatial data, and provides storage and access support of the spatio-temporal data for the industrial geographic information system platform end; and the industrial geographic information system platform end establishes expressions of time dimension and spatial dimension for an object in an industrial process based on the support of the spatio-temporal big data processing end by adopting a composite spatio-temporal object model of a geographic information system principle, displays a shape and an environment of the industrial object through spatial data of the spatio-temporal big data processing end, dynamically displays a state of the industrial object through real-time data of the spatio-temporal big data processing end, and uses a spatio-temporal data collaborative processing method to construct bidirectional mapping and collaborative linkage between a digital space scene and a geo-physical space scene based on the composite spatio-temporal object model to complete macroscopic and microscopic visualization, collaborative processing update, spatio-temporal analysis and linkage analysis of industrial production scenes and processes, and provides collaborative joint control of industrial production processes and devices based on the device acquisition control end.

Alternatively, the device configuration control module is provided with two environments for developing and operating, providing a newly-built project, drawing a packaging device model, defining a device basic attribute, triggering alarm and early warning conditions, providing model animation, topological lines with associated devices, spatially associated objects, I/O device communications, data storage and project operation and release, providing secondary development of a computer programming language, providing associated topology, map update and topology analysis with macroscopic and microscopic multi-scene devices; and the device real-time data acquisition module supports the standard industrial communication protocol, supports the customized development and adaptation of the non-standard communication protocol, and acquired objects comprise the sensors, the controller, the monitoring system, the protocol converter and the mobile device in the industrial production environment.

Alternatively, the dynamic real-time data comprise: environmental monitoring, device and personnel monitoring, and industrial video dynamic data of the industrial production environment and process; and the static geospatial data comprise: topographic and landform, humanistic environment and facility and device basic static data related to an industrial geographic information environment.

Alternatively, the spatio-temporal big data analysis is implemented by performing multi-dimensional comprehensive query and spatial analysis on time, attributes and space of spatio-temporal data of different time phases, different types and different regions and deep learning prediction and simulation analysis on multi-type spatio-temporal data based on non-deterministic mathematical algorithm of statistics and fuzzy mathematics, deterministic algorithm of dynamics rule and deep learning training algorithm of big data.

Alternatively, the spatio-temporal data collaborative processing method establishes digital expression of the industrial object in reality based on the composite spatio-temporal object model, accesses real-time data drive for the industrial object, dynamically updates internal and external states of the industrial object, and constructs the bidirectional mapping and collaborative linkage between the digital space scene and the geo-physical space scene of the industrial object, specifically comprising the following steps of:

step S1: establishing a geometric spatial model of the industrial object through the geographic information system, forming the visualization of an external geographic environment and an internal fine model of the industrial object, and attaching an attribute feature of the object thereof to realize complete expression of the industrial object in a geographic space;

step S2: establishing a cascade transitive relation and a topological association relationship between the industrial objects according to an industrial production business and technological process, and adding the association and linkage to an industrial object model in a behavioral action way to realize response and collaborative update processing of the industrial objects to driving data; and step S3: through the support of the spatio-temporal big data processing end, connecting a real-time data subscription and distribution module, receiving data and message drive of various industrial objects, and realizing response and processing of object behavior features through the inter-object relationship and the object behavior action established in step S2, changing a spatial form and state of the industrial object and a spatial form and state of an associated object of the industrial object, recording the updated industrial object data in an incremental version mode, implementing processing and updating of temporal, spatial and model data of a spatio-temporal object in the whole process of industrial production, and then completing intelligent control of various device objects in the industrial production process through the device acquisition control end.

Alternatively, the composite spatio-temporal object model comprises: a temporal feature, a geometric feature, an attribute feature and a behavior feature of an object of the industrial geographic information system; the temporal feature is information of the object of the industrial geographic information system in a temporal variation dimension, and the temporal feature comprises: spatio-temporal data and time-series temporal data; and a method for obtaining the temporal feature comprises:
establishing a spatio-temporal variation version attribute for spatial data of the object of the industrial geographic information system in an object-oriented way, wherein each industrial object corresponds to one latest version and a plurality of historical versions; and when the industrial object triggers variation updating, recording an object varied each time in a version increment mode, thus forming the spatio-temporal data of a full-spatio-temporal data variation process; in addition, pre-processing real-time time series data corresponding to the industrial object in real time through the spatio-temporal big data processing end to complete cleaning, denoising and serialization, storing the real-time time series data to the object in an object attribute association manner to form the time-series temporal data, and storing a historical version of the time-series temporal data at a big data processing end, wherein the industrial object is inquired and applied through attribute association.

Alternatively, the geometric feature is information of the object of the industrial geographic information system in a visual feature dimension; and a method for obtaining the geometric feature comprises:
establishing geospatial environment visual expression of an industrial environment and an industrial device by a geometrical expression method of the geographical information system to form a macroscopic geographical geometrical form of the industrial object;

establishing fine models of objects inside a plant and a device by manual modeling and automatic scanning modeling methods to form microscopic fine model expression of the industrial object; and establishing fusion of macroscopic geographic data and microscopic fine model data through a spatial position relationship to form bidirectional mapping of a digital space and a geographic physical space of the industrial object to implement geographic positioning of the object of the industrial geographic information system and visual dynamic display of a production system.

Alternatively, the attribute feature is information of the object of the industrial geographic information system in an attribute feature dimension, and the attribute feature comprises: a static attribute and a dynamic attribute; and a method for obtaining the attribute feature comprises:

establishing multi-type and extensible static attribute expression and storage of the industrial object by a relational or non-relational attribute organization method through an object-oriented industrial geographic information object expression; and saving a dynamic attribute associated with the real-time data in a form of meta-information according to dynamic behaviors and features of the industrial object in various scenes, wherein the industrial object invokes the real-time data drive through meta-information, thereby displaying the dynamic attribute of the industrial object, providing underlying data support for complete object expression and big data analysis of the industrial geographic information system, and the meta-information is a corresponding relationship, a filtering relationship and a linkage relationship between the dynamic attribute and the real-time data.

Alternatively, the behavior feature is information of the object of the industrial geographic information system in a interoperation behavior dimension; and a method for obtaining the behavior feature comprises:

according to the object-oriented way and business process needs of various industrial objects, establishing a response method of the object to the attributes thereof and external driving data, wherein the response method comprises the dynamic behavior of the object thereof and the cooperative behavior among multiple objects with topological relationships, and the behavior feature of the object feeds back a result of the object in the geometric feature or attribute feature of the object; and through a standard industrial control interface protocol of the device configuration control module, integrating a control behavior and state mapping of an industrial facility and device object into the object to form mutual feedback of behavior and data; and then, triggering the behavior feature response of the object through real-time data and signal drive provided by the spatio-temporal big data processing end, and then implementing adaptive topological correlation processing and intelligent control operation of the industrial facility and device object.

Alternatively, a single spatio-temporal object is used as a basic unit, and a snapshot after each object variation is stored in a version manner, and the acquisition, editing and analysis operations of the spatio-temporal data are all based on a granularity of a single object to implement rapid conflict processing in a multi-user concurrent scene.

According to the present invention, various real-time data in the industrial production environment are acquired through the device acquisition control end, and control interfaces are provided for various devices; the acquired real-time data are transmitted to the spatio-temporal big data processing end through the network, and cleaning, denoising, caching, distribution and persistent storage of the data are completed; scene and facility and device space data related to industrial production are recorded into the spatio-temporal big data processing system through data import and processing; and on the industrial geographic information system platform end, the real-time data and spatial data in the spatio-temporal big data are expressed and visualized in the form of composite spatio-temporal object, and the macroscopic and microscopic contents of the industrial production scenes and processes are displayed, the bidirectional mapping between the digital space scene and the geophysical space scene is implemented, and the industrial device is coordinated through the interface of the device acquisition control end, thus providing a visual management and control platform based on the geographic information system for the intelligent industrial production.

BRIEF DESCRIPTION OF THE DRAWINGS

Various other advantages and benefits will become apparent to those of ordinary skills in the art upon reading the following detailed description of preferred embodiments. The accompanying drawings are only for the purpose of illustrating the preferred embodiments and are not to be deemed as limiting the present invention. Moreover, the same reference symbols are used to represent the same parts throughout the accompanying drawings. In the drawings.

DETAILED DESCRIPTION OF THE EMBODIMENTS

In order to make the above objects, features and advantages of the present invention be more clearly understood, the present invention will be described in further detail below with reference to the drawings and detailed description. It should be understood that the specific embodiments described herein are only for the purpose of explaining the present invention, are only a part of the embodiments of the present invention rather than all of the embodiments, and are not used to limit the present invention.

Figure 1:
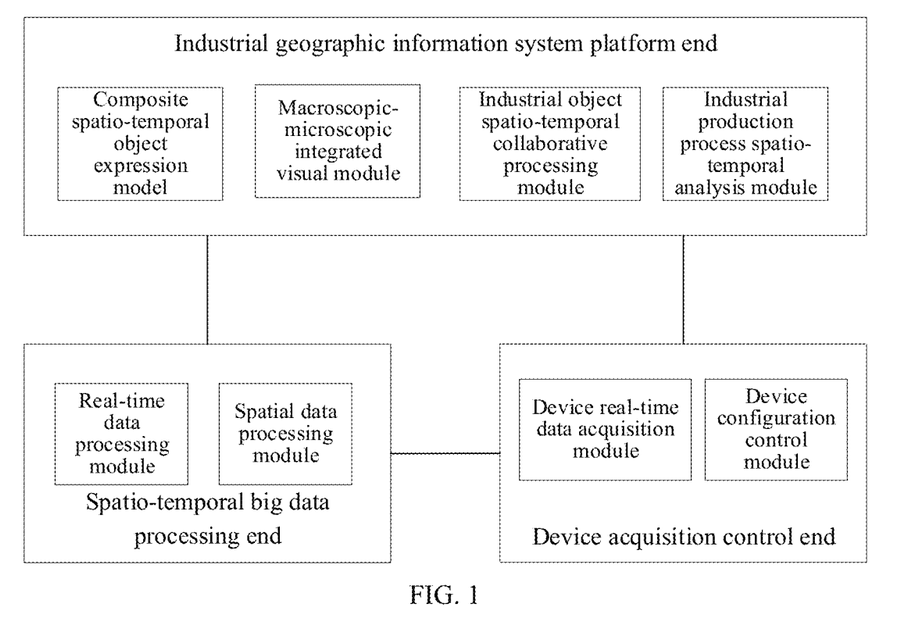
FIG. 1 is a structural block diagram of an industrial geographic information system provided by the embodiments of the present invention.
Figure 2:
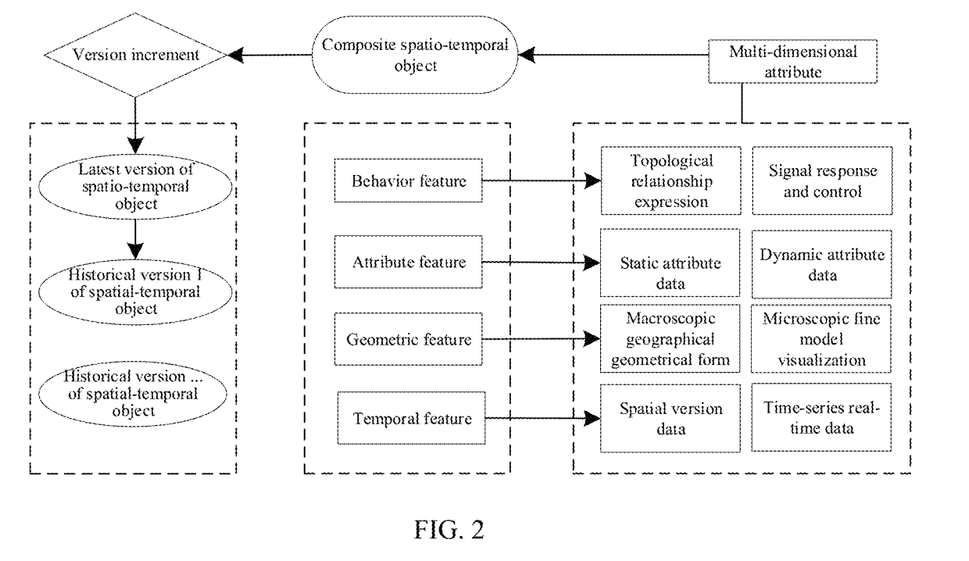
FIG. 2 is a structural block diagram of a composite spatio-temporal object of the industrial geographic information system provided by the embodiments of the present invention.
Figure 3:
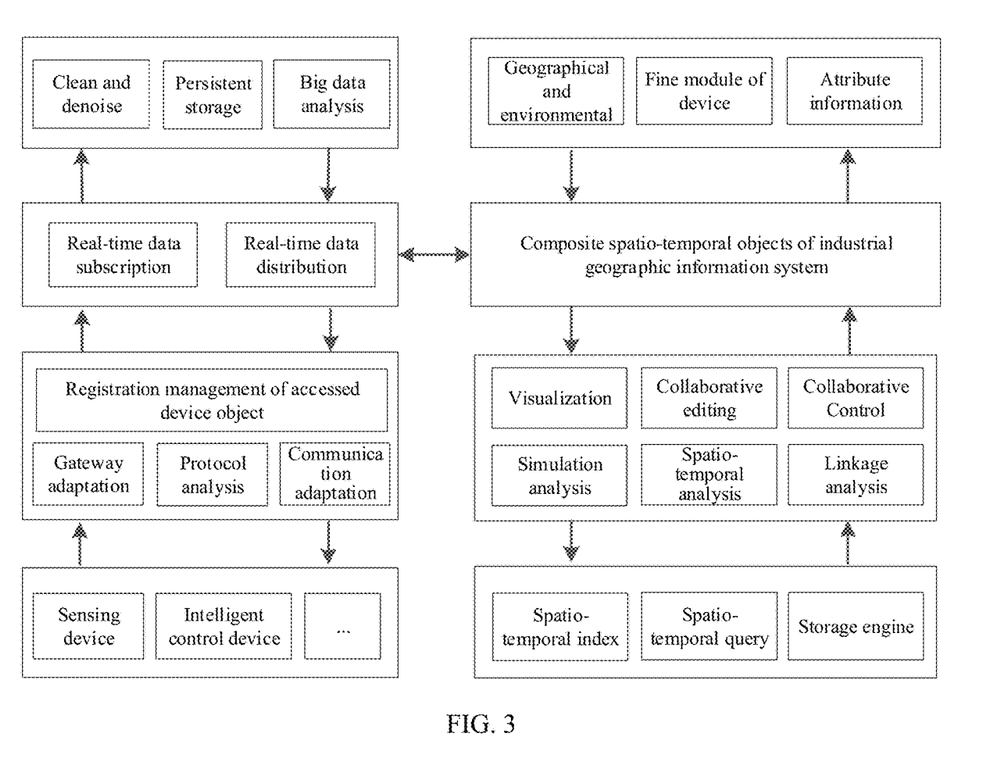
FIG. 3 is an operation flow chart of the industrial geographic information system provided by the embodiments of the present invention.

Please refer to FIG. 1, FIG. 2 and FIG. 3.

FIG. 1 and FIG. 3 illustrate a structural block diagram and a flow chart of an industrial geographic information system in this embodiment. The industrial geographic information system specifically comprises: a device acquisition control end, a spatio-temporal big data processing end and an industrial geographic information system platform end, wherein the device acquisition control end, the spatio-temporal big data processing end and the industrial geographic information system platform end are connected by means of wire or wireless.

The device acquisition control end may be developed based on embedded, configuration technology and mobile App, and the device acquisition control end comprises a device real-time data acquisition module and a device configuration control module. This part provides support for mainstream device communication protocols such as Modbus, OPC, OPCUA, MQTT, Socket, Http, WebSocket, etc. Through gateway adaptation, protocol analysis and communication adaptation on registration management of the accessed device object, the device real-time data acquisition module acquires real-time data of sensing devices such as various sensors, monitoring devices, lidar, mobile devices in the industrial production environment, as well as real-time online information of plant state, production technology and operation management data, and distributes the real-time data through a data subscription mechanism.

Meanwhile, the device configuration control module also provides a newly-built project for configuration control, draws a packaging device model, defines a device basic attribute, triggers alarm and early warning conditions, provides model animation, topological lines with associated devices, spatially associated objects, I/O device communications, data storage and project operation and release, supports secondary development of a plurality of languages such as JavaScript, Python and VB script, provides associated topology, map update and topology analysis with macroscopic and microscopic multi-scene devices, and finally realizes configuration control of a production device through a controller, a frequency converter, a protector and the like. The device acquisition control end is not only a data collector, but also an executor of decision-making execution information. After the acquired data are subjected to spatio-temporal big data analysis and industrial geographic information system business analysis through a wired or wireless connected subscription and distribution mechanism, a control execution signal is returned to the device acquisition control end, thus completing the control of the production device.

The spatio-temporal big data processing end is obtained based on a Hadoop big data basic platform. On one hand, supported by real-time data streaming computing, the spatio-temporal big data processing end subscripts the dynamic real-time data of the device acquisition control end, conducts cleaning, denoising, caching, distribution and persistent storage processing on the dynamic real-time data, and associates the related data release with composite spatio-temporal objects of various industrial geographic information systems.

On the other hand, the spatio-temporal big data processing end completes processing of formatted and unformatted static geospatial data such as topographic and landform, humanistic environment, facilities and devices related to various industrial geographic information environments through import and entry. Based on the support of the dynamic real-time data and the static geospatial data, multi-dimensional comprehensive query and spatial analysis of spatio-temporal data of different time phases, different types and different regions (composed of dynamic real-time data and static geospatial data) are provided, and deep learning prediction and simulation analysis on multi-type spatiotemporal data are performed. The dynamic real-time data comprise: environmental monitoring, device and personnel monitoring, and industrial video dynamic data of the industrial production environment and process; the static geospatial data comprise: topographic and landform, humanistic environment and facility and device basic static data related to an industrial geographic information environment.

The industrial geographic information system platform end is obtained based on a temporal geographic information system, comprising a composite spatio-temporal object module, a macroscopic-microscopic integrated visualization module, an industrial object spatio-temporal collaborative processing module and an industrial production process spatio-temporal analysis module.

The industrial geographic information system platform end adopts the composite spatio-temporal object model to establish expressions of time dimension and spatial dimension for an object in an industrial process, displays a form and an environment of the industrial object through spatial data of the spatio-temporal big data processing end, dynamically displays a state of the industrial object through real-time data of the spatio-temporal big data processing end, and uses a spatio-temporal data collaborative processing method to construct bidirectional mapping and collaborative linkage between a digital space scene and a geo-physical space scene based on the composite spatio-temporal object model to complete macroscopic and microscopic visualization, collaborative processing update, spatio-temporal analysis and linkage analysis of industrial production scenes and processes, and provides collaborative joint control of industrial production processes and devices based on the device acquisition control end. expressions of time dimension and spatial dimension for an object in the industrial process, displays the form and environment of the industrial objects through the spatial data of the spatio-temporal big data processing terminal, dynamically displays the state of the industrial objects through the real-time data of the spatio-temporal big data processing terminal, and constructs the bidirectional mapping and collaborative linkage between the digital space scene and the geo-physical space scene based on the composite spatio-temporal object model by using the spatio-temporal data collaborative processing method.

Based on the storage of composite spatio-temporal objects, related various real-time data, geographical and environmental data, device fine model data, multi-source attribute information and so on of the industrial geographic information system, the industrial geographic information system platform end realizes visualization of macroscopic-scenes and microscopic-models of various industrial spatio-temporal objects through a three-dimensional rendering engine, providing common desktop, Web and mobile access, and also providing the use of AR/VR devices, accesses business system data such as safety management system, operation management system, technical service system, production management system and support security system according to the control needs of the industrial production process, and fuses real-time and historical data in a visual scene for simulation analysis, spatio-temporal analysis and topological linkage analysis, and finally outputs control signals or instructions corresponding to geographic physical spaces of industrial spatio-temporal objects according to analysis results.

In addition, the industrial geographic information system platform end realizes multi-person and online collaborative editing under a network environment through a composite spatio-temporal object versioning collaborative processing mechanism, updates and stores versioned history of various industrial geographic information system spatio-temporal objects in real time with a granularity of objects, and provides spatio-temporal index and spatio-temporal query, thus realizing efficient spatio-temporal data access and storage in the industrial production process.

An important foundation of the industrial geographic information system platform is to establish macroscopic and microscopic visual expressions of an industrial virtual environment and an industrial device. The industrial virtual environment consists of geographical scenes and industrial scenes. The geographical scenes generally comprise basic surveying and mapping data, digital elevation model, digital terrain model, digital orthophoto, 3D oblique photography, laser point cloud data, panoramic image data, and the like. The industrial scenes generally comprise industrial production facilities, industrial living facilities, residents' living facilities, market service facilities, and the like. An industrial device model is a core of microscopic-scene expression in the industrial geographic information system, and is an important means of fine display, voxel construction and topological association of industrial facility and device objects, comprising three major parts such as physical space, virtual-real interaction and mapping linkage. Industrial devices in the physical space comprise device components, device parts, sensors and control systems. A virtual-real interactive system comprises data acquisition and information feedback, which depicts the physical space in a multi-resolution and all-round way by means of digitization. Mapping linkage simulates a real production environment, conducts multi-time and multi-dimensional operation and experiment on the device model, thus generating multi-time and multi-dimensional information of device operation in the real environment, and controlling and optimizing the device.

The spatio-temporal data collaborative processing method establishes digital expression of the industrial object in reality based on the composite spatio-temporal object model, accesses real-time data drive for the industrial object, dynamically updates internal and external states of the industrial object, and constructs the bidirectional mapping and collaborative linkage between the digital space scene and the geo-physical space scene of the industrial object, specifically comprising the following steps of:

step S1: establishing a geometric spatial model of the industrial object through the geographic information system, forming the visualization of an external geographic environment and an internal fine model of the industrial object, and attaching an attribute feature of the object thereof to realize complete expression of the industrial object in a geographic space;

step S2: establishing a cascade transitive relation and a topological association relationship between the industrial objects according to an industrial production business and technological process, and adding the association and linkage to an industrial object model in a behavioral action way to realize response and collaborative update processing of the industrial objects to driving data; and step S3: through the support of the spatio-temporal big data processing end, connecting a real-time data subscription and distribution module, receiving data and message drive of various industrial objects, and realizing response and processing of object behavior features through the inter-object relationship and the object behavior action established in step S2, changing a spatial form and state of the industrial object and a spatial form and state of an associated object of the industrial object, recording the updated industrial object data in an incremental version mode, implementing processing and updating of temporal, spatial and model data of a spatio-temporal object in the whole process of industrial production, and then completing intelligent control of various device objects in the industrial production process through the device acquisition control end.

FIG. 2 illustrates a structural block diagram of a composite spatio-temporal object of the industrial geographic information system in this embodiment. The composite spatio-temporal object is an important basic element of data expression, analysis and storage in the industrial geographic information system, provides versioned historical temporal data storage, integrates macroscopic geographical geometrical form and microscopic fine model visualization, connects industrial real-time sensing data with static attribute data, opens up expression and control of the object of the industrial geographic information system, and respectively corresponds to a temporal feature, a geometric feature, an attribute feature and a behavior feature of the composite spatio-temporal object. That is, the composite spatio-temporal object model comprises: the temporal feature, the geometric feature, the attribute feature and the behavior feature of the object of the industrial geographic information system.

The temporal feature is information of the object of the industrial geographic information system in a temporal variation dimension, and the temporal feature comprises: spatio-temporal data and time-series temporal data; and a method for obtaining the temporal feature comprises:

establishing a spatio-temporal variation version attribute for spatial data of the object of the industrial geographic information system in an object-oriented way firstly, wherein each industrial object corresponds to one latest version and a plurality of historical versions; and when the industrial object triggers variation updating, recording an object varied each time in a version increment mode, thus forming the spatio-temporal data of a full-spatio-temporal data variation process; in addition, pre-processing real-time time series data corresponding to the industrial object in real time through the spatio-temporal big data processing end to complete cleaning, denoising and serialization, storing the real-time time series data to the object in an object attribute association manner to form the time-series temporal data, and storing a historical version of the time-series temporal data at a big data processing end, wherein the industrial object is inquired and applied through attribute association.

Generally speaking, for the spatial data of the object of the industrial geographic information system, a spatio-temporal variation version of a spatial object is established in an object-oriented way, and the whole spatio-temporal variation process is recorded in an incremental way. For the sensing real-time time series data of the object of the industrial geographic information system, cleaning, denoising, serialization, and the like of the data are completed through the real-time preprocessing of the spatio-temporal big data processing end, and the data are saved to the object in the way of object attribute association. The spatio-temporal variation version is characterized by taking a single spatio-temporal object as a basic unit, storing a snapshot after each object variation in a version mode, and taking the single object as a granularity for the acquisition, editing and analysis of the spatio-temporal data, thus realizing rapid conflict processing in multi-user concurrent scenes.

The geometric feature is information of the object of the industrial geographic information system in a visual feature dimension; and a method for obtaining the geometric feature comprises:

establishing geospatial environment visual expression of an industrial environment and an industrial device by a geometrical expression method of the geographical information system to form a macroscopic geographical geometrical form of the industrial object first; establishing fine models of objects inside a plant and a device by manual modeling and automatic scanning modeling methods to form microscopic fine model expression of the industrial object; and finally establishing fusion of macroscopic geographic data and microscopic fine model data through a spatial position relationship to form bidirectional mapping of a digital space and a geographic physical space of the industrial object to implement geographic positioning of the object of the industrial geographic information system and visual dynamic display of a production system.

Generally speaking, the extensible macroscopic geographical geometrical form and the microscopic fine model expression of the spatial objects are established in the object-oriented way, and the visual expression of the geospatial environment is provided for the industrial environment and the industrial device respectively, the fine models of the objects inside the plant and the device are provided, and the bidirectional mapping between the digital space and the geographic physical space of the industrial production process and objects is established, so as to realize the geographical positioning of the object of the industrial geographic information system and the visual dynamic display of the production system.

The attribute feature is the information of the object of the industrial geographic information system in the attribute feature dimension, which provides multi-type and extensible attribute storage at an object level in the form of NoSQL, which saves the static attributes of the objects thereof and the dynamic attributes in various behavior scenes, and provides underlying data support for the complete object expression and big data analysis of the industrial geographic information system. The attribute feature comprises: a static attribute and a dynamic attribute; and a method for obtaining the attribute feature comprises:

establishing multi-type and extensible static attribute expression and storage of the industrial object by a relational or non-relational attribute organization method through an object-oriented industrial geographic information object expression first; and saving a dynamic attribute associated with the real-time data in a form of meta-information according to dynamic behaviors and features of the industrial object in various scenes, wherein the industrial object invokes the real-time data drive through meta-information, thereby displaying the dynamic attribute of the industrial object, providing underlying data support for complete object expression and big data analysis of the industrial geographic information system, and the meta-information is a corresponding relationship, a filtering relationship and a linkage relationship between the dynamic attribute and the real-time data.

The behavior feature is information of the object of the industrial geographic information system in an interoperation behavior dimension; and a method for obtaining the behavior feature comprises:

according to the object-oriented way and business process needs of various industrial objects, establishing a response method of the object to the attributes thereof and external driving data first, wherein the response method comprises the dynamic behavior of the object thereof and the cooperative behavior among multiple objects with topological relationships, and the behavior feature of the object feeds back a result of the object in the geometric feature or attribute feature of the object; and through a standard industrial control interface protocol of the device configuration control module, integrating a control behavior and state mapping of an industrial facility and device object into the object to form mutual feedback of behavior and data; and then, triggering the behavior feature response of the object through real-time data and signal drive provided by the spatio-temporal big data processing end, and then implementing adaptive topological correlation processing and intelligent control operation of the industrial facility and device object.

Generally speaking, the behavior and state features of various industrial spatio-temporal objects are established in the object-oriented way. Based on the standard industrial control interface protocol, the control behavior and state mapping of the industrial facility and device objects are integrated into the objects, and the response and intelligent control operation of self-adaptive topologically related devices or parts are realized according to external real-time data and signal drive. The behavior of the industrial object comprises the dynamic behavior of a single object and the cooperative behavior among multiple objects with topological relationships, supports a quantitative calculation mode based on a mathematical model, and also supports a reasoning qualitative mode based on rules, and an autonomous intelligent mode based on a machine learning model, and adapts to the needs of industrial intelligence in different scenes. Results of the behaviors of the industrial object are fed back in the geometric expression or attribute expression of the object features, providing intelligent, linkage and adaptive support for the industrial object.

Based on the composite spatio-temporal object expression method, objects of various industrial geographic information systems can be abstracted into elements with temporal attributes, spatial attributes and sensing behavior ability. Besides the position and attribute features of ordinary geospatial objects, a task of accessing sensing data is also supported. Through a built-in subscription and distribution module, dynamic data can be continuously or regularly obtained and distributed to the spatio-temporal object visualization and analysis module, the topological association between multiple objects is established through cascade transmission, and the state synchronization and intelligent control of the industrial element objects are implemented through data subscription or message drive.

In conclusion, according to the industrial geographic information system provided by the present invention, various real-time data in the industrial production environment are acquired through the device acquisition control end, and control interfaces are provided for various devices; the acquired real-time data are transmitted to the spatio-temporal big data processing end through the network, and cleaning, denoising, caching, distribution and persistent storage of the data are completed; scene and facility and device space data related to industrial production are recorded into the spatio-temporal big data processing system through data import and processing; and on the industrial geographic information system platform end, the real-time data and spatial data in the spatio-temporal big data are expressed and visualized in the form of composite spatio-temporal object, and the macroscopic and microscopic contents of the industrial production scenes and processes are displayed, the bidirectional mapping between the digital space scene and the geophysical space scene is implemented, and the industrial device is coordinated through the interface of the device acquisition control end, thus providing a visual management and control platform based on the geographic information system for the intelligent industrial production.

Although the preferred embodiments of the present invention have been described, those skilled in the art can make additional changes and modifications to these embodiments once they know the basic inventive concepts. Therefore, the appended claims are intended to be interpreted as including the preferred embodiments and all the changes and modifications that fall within the scope of the embodiments of the present invention.

Finally, it should also be noted that relational terms herein such as first and second, etc., are used merely to distinguish one entity or operation from another entity or operation, and do not necessarily require or imply there is any such relationship or order between these entities or operations. Moreover, the terms "including", "comprising" or any variations thereof are intended to embrace a non-exclusive inclusion, such that a process, a method, an article, or a terminal device including a series of elements, includes not only those elements but also includes other elements not expressly listed, or also includes elements inherent to such process, method, article, or terminal device. In the absence of further limitation, an element defined by the phrase "including one . . . " does not exclude the presence of additional identical element in the process, method, article, or terminal device.

The embodiments of the present invention have been described above with reference to the attached drawings, but the present invention is not limited to the above specific embodiments, which are only schematic, not restrictive. Under the inspiration of the present invention, those of ordinary skills in the art can make many forms without departing from the purpose of the present invention and the scope protected by the claims, which are all within the protection of the present invention.

What is claimed is:

1. An industrial geographic information system, comprising: a processor and a memory, wherein an instruction is stored in the memory, and in response to executing the instruction by the processor, the processor is configured to:
    adopt customized adaptation to a standard industrial communication protocol and a non-standard communication protocol, and acquire sensing data of sensors, controllers, monitoring systems, protocol converters and mobile devices in an industrial production environment in real time;
    provide a development and operation environment, for configuration expression of a human-computer interface of the industrial geographic information system, monitor and control the devices in the industrial production environment, and provide interactive and execution support on device monitoring;
    perform the spatio-temporal big data processing end is used for real-time data processing and storage and processing of geospatial data, access dynamic real-time data of the device acquisition control end through a network, perform cleaning, denoising, caching, distribution and persistent storage processing on the dynamic real-time data, complete storage of formatted and unformatted static geospatial data through import and entry, provide spatio-temporal big data analysis of spatio-temporal data composed of the dynamic real-time data and the static geospatial data, provide storage, access and historical evolution support of the spatio-temporal data, and perform presentation, comparison and analysis application on data of the industrial geographic information system from time dimension and spatial dimension, wherein the dynamic real-time data comprises: environmental monitoring, device and personnel monitoring, and industrial video dynamic data of the industrial production environment and process; and the static geospatial data comprises: topographic and landform, humanistic environment and facility and device basic static data related to an industrial geographic information environment; and
    establish expressions of time dimension and spatial dimension for an industrial object in an industrial process by adopting a composite spatio-temporal object model of a geographic information system principle, display a form and an environment of the industrial object through spatial data, dynamically display a state of the industrial object through real-time data, use a spatio-temporal data collaborative processing method to construct bidirectional mapping and collaborative linkage between a digital space scene and a geo-physical space scene based on the composite spatio-temporal object model to complete macroscopic and microscopic visualization, collaborative processing update, spatio-temporal analysis and linkage analysis of industrial production scenes and processes, and provide collaborative joint control of industrial production processes and devices;
    wherein the spatio-temporal data collaborative processing method establishes digital expression of the industrial object in reality based on the composite spatio-temporal object model, accesses real-time data drive for the industrial object, dynamically updates internal states and external states of the industrial object, wherein the internal states refer to structural changes of the industrial object and the external states refer to scale changes of the industrial object, and constructs the bidirectional mapping and collaborative linkage between the digital space scene and the geo-physical space scene of the industrial object, specifically comprising the following steps of:
        step S1: establishing a geometric spatial model of the industrial object through the industrial geographic information system, forming the visualization of an external geographic environment and an internal fine model of the industrial object, which contains a configuration of the industrial object, and attaching an attribute feature of the industrial object thereof to realize complete expression of the industrial object in a geographic space;
        step S2: establishing a cascade transitive relation and a topological association relationship between the industrial objects according to an industrial production business and technological process, and adding the association and linkage to an industrial object model in a behavioral action way to realize response and collaborative update processing of the industrial objects to driving data; and
        step S3: connecting a real-time data subscription and distribution module, receiving data and message drive of various industrial objects, and realizing response and processing of object behavior features through the inter-object relationship and the object behavior action established in the step S2, changing a spatial form and activity of the industrial object and a spatial form and activity of an associated object of the industrial object, recording the updated industrial object data in an incremental version mode, implementing processing and updating of temporal, spatial and model data of a spatio-temporal object in the whole process of industrial production, and then completing intelligent control of various device objects in the industrial production process.

2. The industrial geographic information system according to claim 1, wherein the processor is further configured to be provided with two environments for developing and operating, providing a newly-built project, drawing a packaging device model, defining a device basic attribute, triggering alarm and early warning conditions, providing model animation, topological lines with associated devices, spatially associated objects, I/O device communications, data storage and project operation and release, providing secondary development of a computer programming language, providing associated topology, map update and topology analysis with macroscopic and microscopic multi-scene devices; and support the standard industrial communication protocol, and support the customized development and adaptation of the non-standard communication protocol, wherein acquired objects comprise the sensors, the controller, the monitoring system, the protocol converter and the mobile device in the industrial production environment.

3. The industrial geographic information system according to claim 1, wherein the spatio-temporal big data analysis is implemented by performing multi-dimensional comprehensive query and spatial analysis on time, attributes and space of spatio-temporal data of different time phases, different types and different regions and deep learning prediction and simulation analysis on multi-type spatio-temporal data based on non-deterministic mathematical algorithm of statistics and fuzzy mathematics, deterministic algorithm of dynamics rule and deep learning training algorithm of big data.

4. The industrial geographic information system according to claim 1, wherein the composite spatio-temporal object model comprises: a temporal feature, a geometric feature, an attribute feature and a behavior feature of an object of the industrial geographic information system; the temporal feature is information of the object of the industrial geographic information system in a temporal variation dimension, and the temporal feature comprises: spatio-temporal data and time-series temporal data; and a method for obtaining the temporal feature comprises:
establishing a spatio-temporal variation version attribute for spatial data of the object of the industrial geographic information system in an object-oriented way, wherein each industrial object corresponds to one latest version and a plurality of historical versions; and when the industrial object triggers variation updating, recording an object varied each time in a version increment mode, thus forming the spatio-temporal data of a full-spatio-temporal data variation process; in addition, pre-processing real-time time series data corresponding to the industrial object in real time to complete cleaning, denoising and serialization, storing the real-time time series data to the object in an object attribute association manner to form the time-series temporal data, and storing a historical version of the time-series temporal data at a big data processing end, wherein the industrial object is inquired and applied through attribute association.

5. The industrial geographic information system according to claim 1, wherein the geometric feature is information of the object of the industrial geographic information system in a visual feature dimension; and a method for obtaining the geometric feature comprises:
establishing geospatial environment visual expression of an industrial environment and an industrial device by a geometrical expression method of the geographical information system to form a macroscopic geographical geometrical form of the industrial object;

establishing fine models of objects inside a plant and a device by manual modeling and automatic scanning modeling methods to form microscopic fine model expression of the industrial object; and establishing fusion of macroscopic geographic data and microscopic fine model data through a spatial position relationship to form bidirectional mapping of a digital space and a geographic physical space of the industrial object to implement geographic positioning of the object of the industrial geographic information system and visual dynamic display of a production system.

6. The industrial geographic information system according to claim 1, wherein the attribute feature is information of the object of the industrial geographic information system in an attribute feature dimension, and the attribute feature comprises: a static attribute and a dynamic attribute; and a method for obtaining the attribute feature comprises:
establishing multi-type and extensible static attribute expression and storage of the industrial object by a relational or non-relational attribute organization method through an object-oriented industrial geographic information object expression; and saving a dynamic attribute associated with the real-time data in a form of meta-information according to dynamic behaviors and features of the industrial object in various scenes, wherein the industrial object invokes the real-time data drive through meta-information, thereby displaying the dynamic attribute of the industrial object, providing underlying data support for complete object expression and big data analysis of the industrial geographic information system, and the meta-information is a corresponding relationship, a filtering relationship and a linkage relationship between the dynamic attribute and the real-time data.

7. The industrial geographic information system according to claim 1, wherein the behavior feature is information of the object of the industrial geographic information system in an interoperation behavior dimension of the object of the industrial geographic information system; and a method for obtaining the behavior feature comprises:
according to the object-oriented way and business process needs of various industrial objects, establishing a response method of the object to the attributes thereof and external driving data, wherein the response method comprises the dynamic behavior of the object thereof and the cooperative behavior among multiple objects with topological relationships, and the behavior feature of the object feeds back a result of the object in the geometric feature or attribute feature of the object; and through a standard industrial control interface protocol, integrating a control behavior and state mapping of an industrial facility and device object into the industrial facility and device object to form mutual feedback of behavior and data; and then, triggering the behavior feature response of the industrial facility and device object through real-time data and signal drive, and then implementing adaptive topological correlation processing and intelligent control operation of the industrial facility and device object.

8. The industrial geographic information system according to claim 1, wherein a single spatio-temporal object is used as a basic unit, and a snapshot after each object variation is stored in a version manner, and the acquisition, editing and analysis operations of the spatio-temporal data are all based on a granularity of the single spatio-temporal object to implement rapid conflict processing in a multi-user concurrent scene.

* * * * *